(12) United States Patent
Tajima

(10) Patent No.: US 7,478,458 B2
(45) Date of Patent: Jan. 20, 2009

(54) BIAXIAL HINGE DEVICE OF ELECTRICAL EQUIPMENT

(75) Inventor: Hideya Tajima, Kanagawa (JP)

(73) Assignee: Katoh Electrical Machinery Co., Ltd., Kanagawa (JP)

(*) Notice: Subject to any disclaimer, the term of this patent is extended or adjusted under 35 U.S.C. 154(b) by 200 days.

(21) Appl. No.: 11/387,620

(22) Filed: Mar. 23, 2006

(65) Prior Publication Data

US 2006/0218750 A1     Oct. 5, 2006

(30) Foreign Application Priority Data

Mar. 31, 2005    (JP)   ............................. 2005-102296

(51) Int. Cl.
*E05D 3/10*    (2006.01)
(52) U.S. Cl. ............................. 16/367; 16/366; 16/327; 16/374
(58) Field of Classification Search .................. 16/282, 16/294, 302, 366, 367, 378, 303, 330, 349, 16/324, 343, 344; 361/681
See application file for complete search history.

(56) References Cited

U.S. PATENT DOCUMENTS

| | | | | |
|---|---|---|---|---|
| 3,849,834 | A * | 11/1974 | Mayer | 16/332 |
| 5,867,872 | A * | 2/1999 | Katoh | 16/337 |
| 6,256,837 | B1 * | 7/2001 | Lan et al. | 16/334 |
| 6,553,625 | B2 * | 4/2003 | Lin et al. | 16/342 |
| 6,742,221 | B2 * | 6/2004 | Lu et al. | 16/367 |
| 6,883,206 | B2 * | 4/2005 | Yang et al. | 16/337 |
| 6,912,122 | B2 * | 6/2005 | Chen et al. | 361/681 |
| 7,055,219 | B2 * | 6/2006 | Shiba | 16/367 |
| 7,159,279 | B2 * | 1/2007 | Liu et al. | 16/367 |
| 7,234,204 | B2 * | 6/2007 | Liu et al. | 16/367 |
| 2004/0012920 | A1 * | 1/2004 | Tanimoto et al. | 361/683 |
| 2004/0107540 | A1 * | 6/2004 | Hsu | 16/366 |
| 2004/0141284 | A1 * | 7/2004 | Chen et al. | 361/681 |
| 2004/0179330 | A1 * | 9/2004 | Lee et al. | 361/679 |
| 2004/0196403 | A1 * | 10/2004 | Lee | 348/373 |
| 2005/0005399 | A1 * | 1/2005 | Lu et al. | 16/367 |
| 2005/0102798 | A1 * | 5/2005 | Kato | 16/366 |

\* cited by examiner

*Primary Examiner*—Victor Batson
*Assistant Examiner*—Emily M Morgan
(74) *Attorney, Agent, or Firm*—Notaro & Michalos P.C.

(57) ABSTRACT

A biaxial hinge device, rotates a second member with regard to a first member around a first axis for opening and closing in a vertical direction, and rotates the second member with regard to the first member around a second axis in a horizontal direction. The hinge has a vertical direction rotation controlling mechanism of the second member having the first axis, and a horizontal direction rotation controlling mechanism of the second member having the second axis. A movable stopper is further mounted between a supporting member of the vertical direction rotation controlling mechanism and an attaching member of the horizontal direction rotation controlling mechanism, to which the supporting member is rotably attached. A rotation in a horizontal direction is therefore controlled within a range of predetermined angles, additionally further rotation in the same direction is available via pressing of the second member into the desired direction.

7 Claims, 8 Drawing Sheets

BIAXIAL HINGE DEVICE OF ELECTRICAL EQUIPMENT

BACKGROUND OF THE INVENTION

1. Field of the Invention

The present invention relates to a biaxial hinge device of an electrical equipment, suitable for a use in a first member as a main body portion equipped with a keyboard for portable electrical equipments, such as a laptop personal computer, a notebook personal computer, video cameras, etc., and a second member as a display portion of a liquid crystal screen.

2. Description of the Related Art

Among the above-indicated electrical equipments, etc., there is conventionally known in the Japanese Patent Application No. 2004-153899 an electrical equipment with a biaxial hinge device which, in addition to allowing for an opening and closing of a second member with regard to a first member in a vertical direction, can rotate in a horizontal direction the second member, when opened with regard to the first member.

The above-indicated Japanese Patent Application No. 2004-153899 sets forth a structure, in which a second member rotates with regard to a first member in a horizontal direction between 0° and 180°; further according to the structure of the same Patent Application, a selective rotation to 180° in either one direction, either right or left, is possible; in a range of rotation beyond 180° however, a rotation is prevented by force of a fixing stopper means installed on a hinge device.

An above-described structure causes a problem of a bad operability in meetings as business negotiations and meetings for layout examination: it is often necessary to rotate a first member and second member altogether, since a rotation of the second member with regard to the first member is only available in one direction, where a second member is opened with regard to a first member and it is necessary to show a personal computer display screen to people surrounding a running personal computer, i.e. where a person in front of the second member operates a keyboard on the first member, showing a display screen on the second member to the people on the both sides, either one of two persons side by side intends to operate the first member, showing a display screen to a person in front or people on their next side.

On the other hand, personal computers are often operated by one operator. In this condition it is desirable for a second member not to be rotated with regard to a first member, i.e. for both members to be stably placed in a fixed position in which both are in positive (a position in which both members face an operator in front).

SUMMARY OF THE INVENTION

For solving the above-mentioned problems, it is an object of the present invention to provide a biaxial hinge device of electrical equipment in which a second member can be opened/closed with regard to a first member and normally the second member is retained in a fixed position with regard to the first member, while, if necessary, the second member can be rotated with regard to the first member.

In the following an embodiment of the present invention is described in case of an application thereof to a laptop personal computer; needless to say, this invention is applicable also to other electrical equipments, such as notebook personal computer and video camera, etc., i.e. those with a second member to be opened and closed with regard to a first member.

In order to attain the above-described object, the present invention is a biaxial hinge device of an electrical equipment which, with a use of a first axis and a second axis, rotates a second member of the above-indicated electrical equipment with regard to a first member around the above-indicated first axis for a vertical opening and closing, and which rotates the above-indicated second member in a horizontal direction; it is characterized in that includes: vertical direction rotation controlling means of the above-indicated second member having the above-indicated first axis; a horizontal direction rotation controlling means of the above-indicated second member having the above-indicated second axis; further in the above indicated biaxial hinge device a movable stopper means provided between a supporting member of the above-indicated vertical direction rotation controlling means and an attaching member of the above-indicated horizontal direction rotation controlling means; additionally in the above-indicated biaxial hinge device a movable stopper means is constituted for controlling a horizontal rotation of said second member with regard to the above-indicated first member and enabling a further rotation in the same direction, due to a release from the above-indicated control.

At this time, in the present invention, the above-indicated movable stopper means is composed of a fixing stopper rotating together with the above-indicated supporting member and a movable stopper which is mounted toward the above-indicated attaching member and moves only when a predetermined pressing force is added thereto.

Further, in the present invention, the above-indicated horizontal direction rotation controlling means is equipped with a rotation cam, a fixing cam and a resilient means.

Further, in the present invention, the above-indicated vertical direction rotation controlling means are each equipped with a click means for stably halting the above-indicated second member at a predetermined rotation angle in a horizontal direction with regard to the above-indicated first member.

When the present invention is structured as described in the claim 1, a main body portion with a keyboard is a first member and an LCD display portion is a second member, Further in case that the first member and the second member are used in a electrical equipment such as a lap top personal computer and a video camera, a normal opening-closing operation is stably conducted and a rotation of a second member in a range of 360° is possible in both directions, which improves operability.

When the present invention is structured as described in the claim 2, allows, a structure is simplified, allowing a horizontal rotation of a second member with regard to a first member to be controlled, and the second, member to be rotated beyond 180° with regard to the first member, if necessary.

When the present invention is structured as described in the claim 3, a second member is closed, or opened, with regard to a first member from the pre-defined opening angle, and locked in a closed condition and at a predetermined opened angle.

When the present invention is structured as described in the claim 4, prevents an easy rotation of a second member without a certain amount of force, although a second member can be rotated within a range of 360°. Therefore, the second member is continuously stable in use.

DETAILED DESCRIPTION OF THE PREFERRED EMBODIMENT(S)

Figure 1:
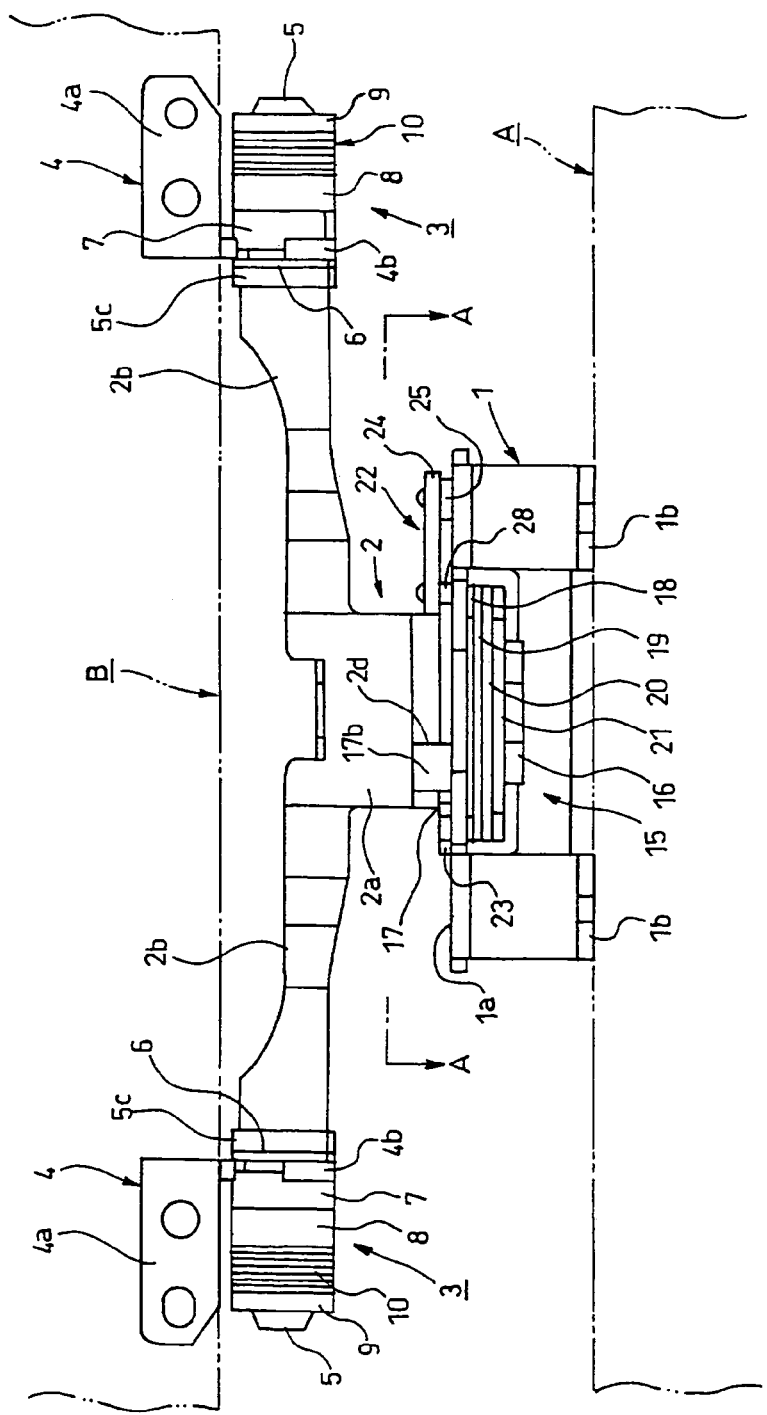
FIG. 1 is a front view of a biaxial hinge device according to the present invention.
Figure 2:
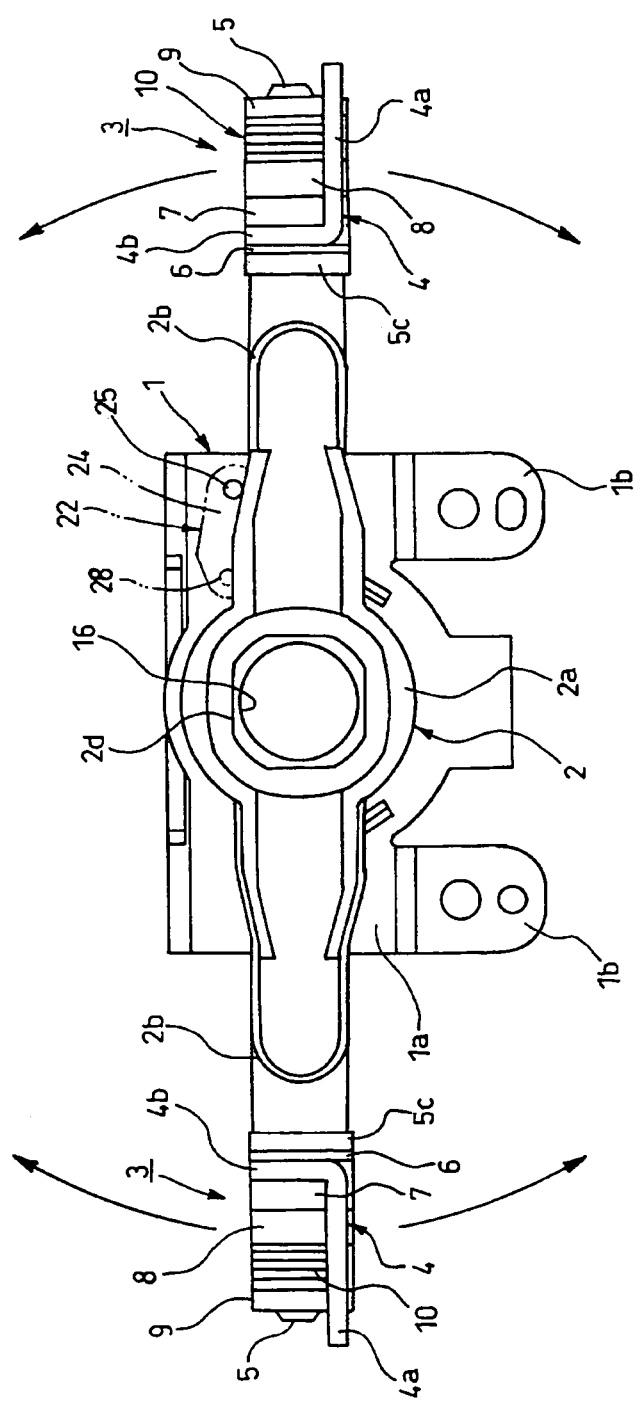
FIG. 2 is a plan view of a biaxial hinge device according to the present invention.

Hereinafter, a biaxial hinge device of an electrical equipment according to the present invention will be described in detail, based on the accompanying drawings.

A reference numeral 1 indicates an attaching member. The, attaching member 1 is fixed to a side of a first member A which is shown e.g. in FIGS. 1 and 3 with an imaginary line; the first member A constitutes a main body portion of a laptop personal computer with a keyboard. the attaching member 1 has an attaching base portion 1a and a pair of attaching portions 1b; the attaching portions 1b are formed from portions folded downward in a perpendicular direction at the attaching base portion 1a.

Figure 3:
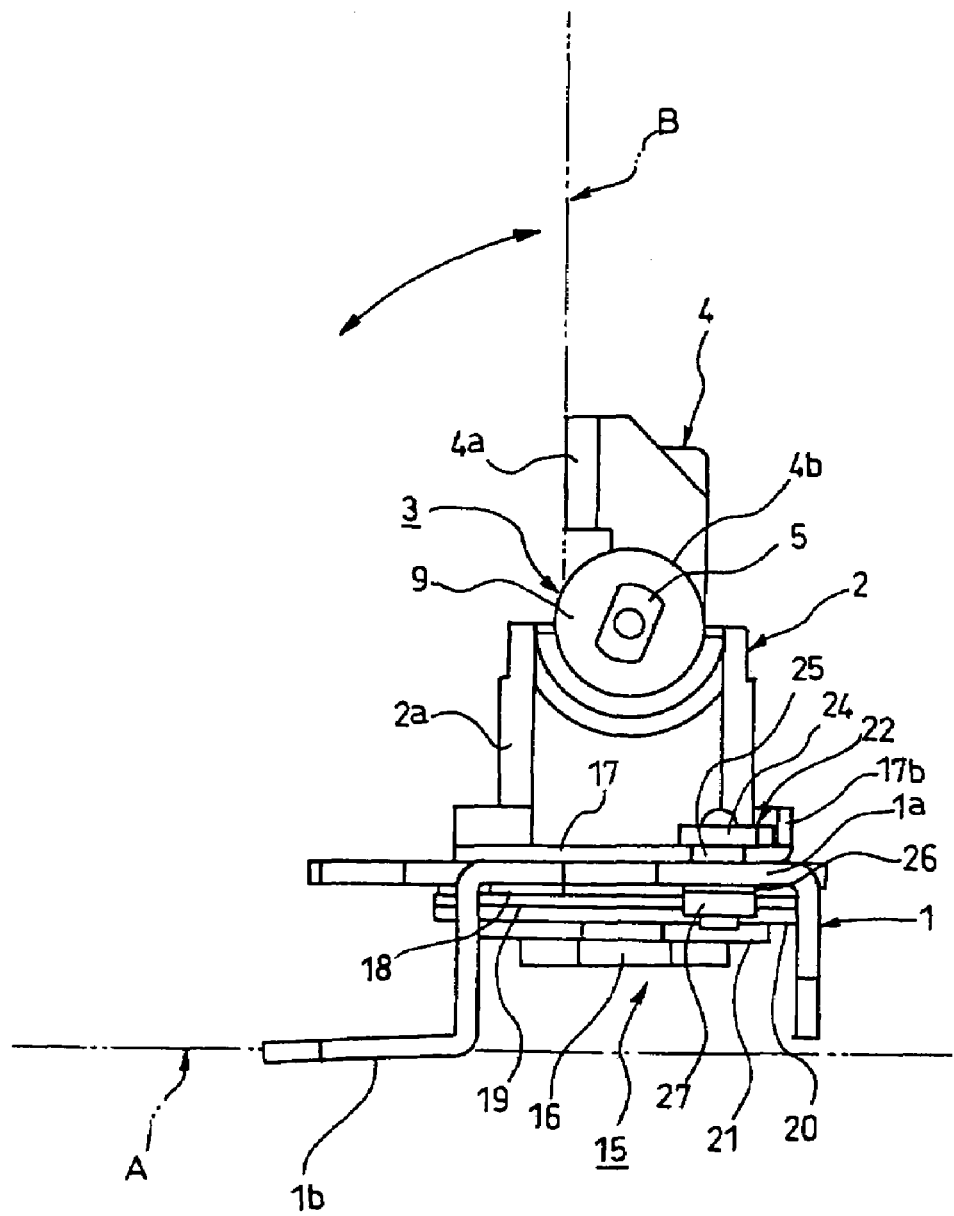
FIG. 3 is a right side view of a biaxial hinge device according to the present invention.
Figure 4:
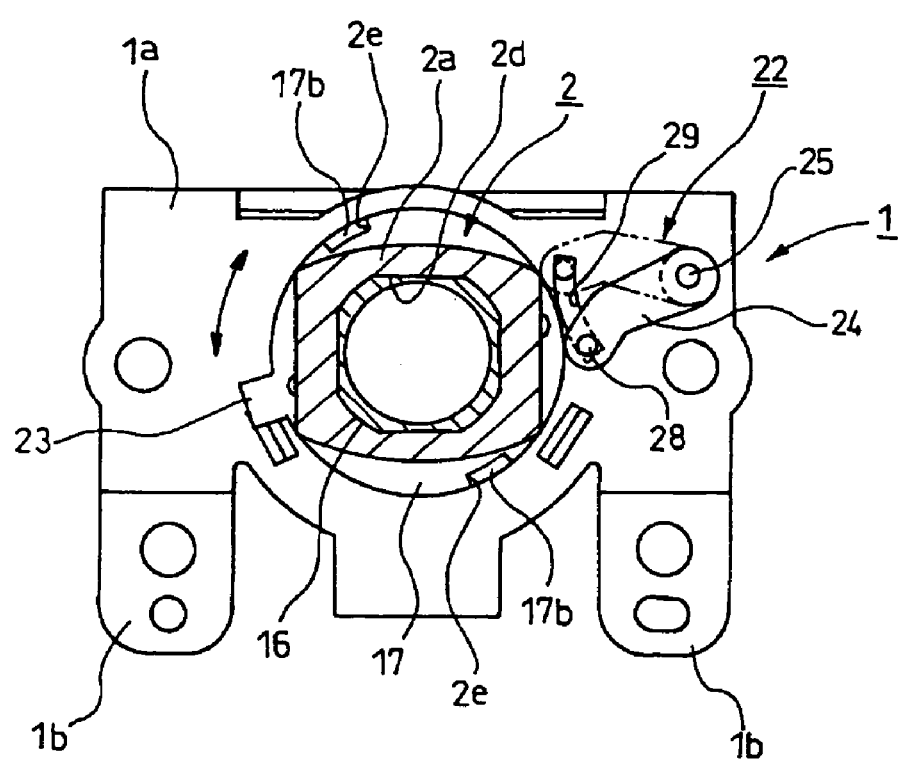
FIG. 4 is an A-A sectional view of FIG. 1.
Figure 5:
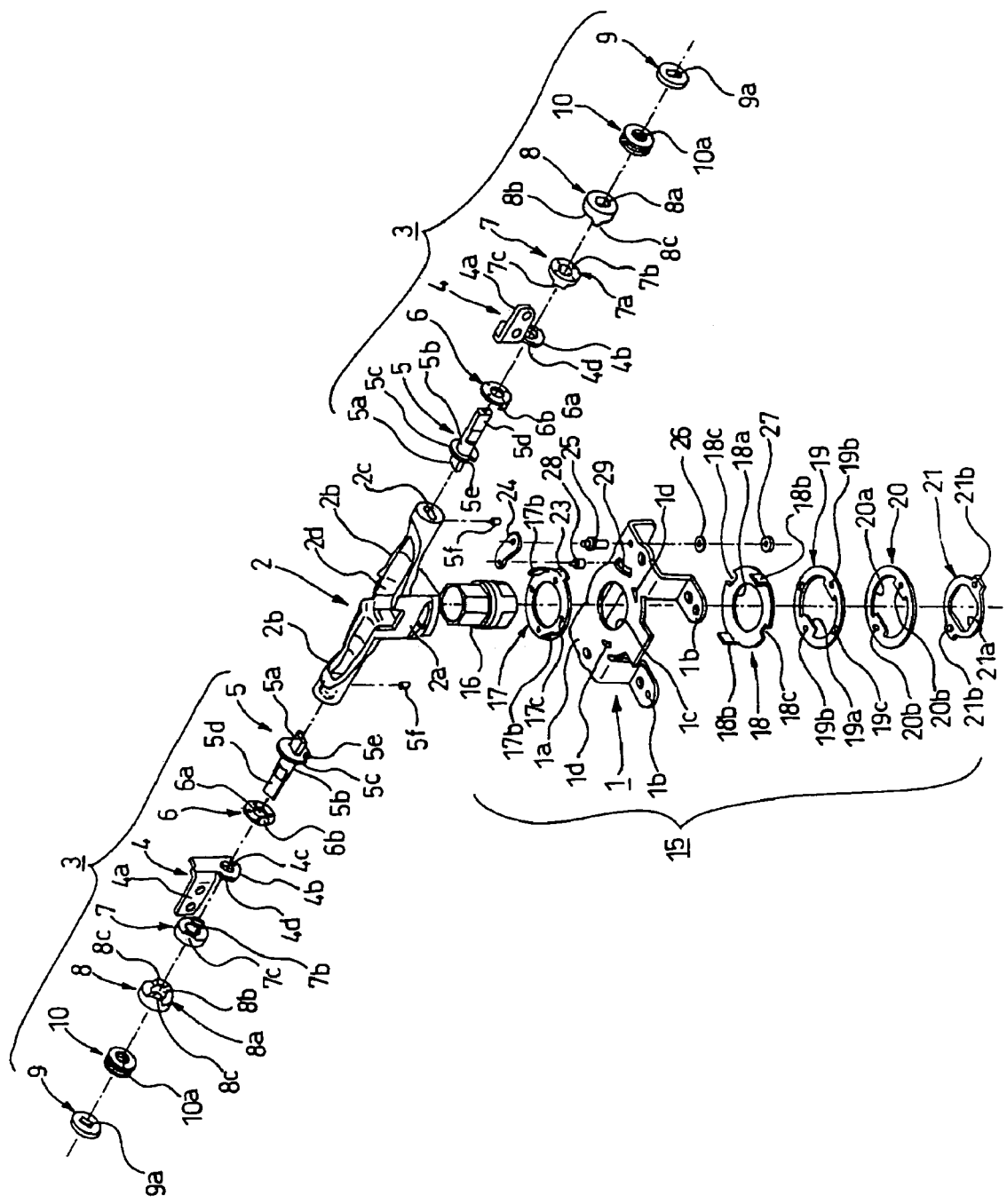
FIG. 5 is an exploded perspective view of a biaxial hinge device according to the present invention.
Figure 6:
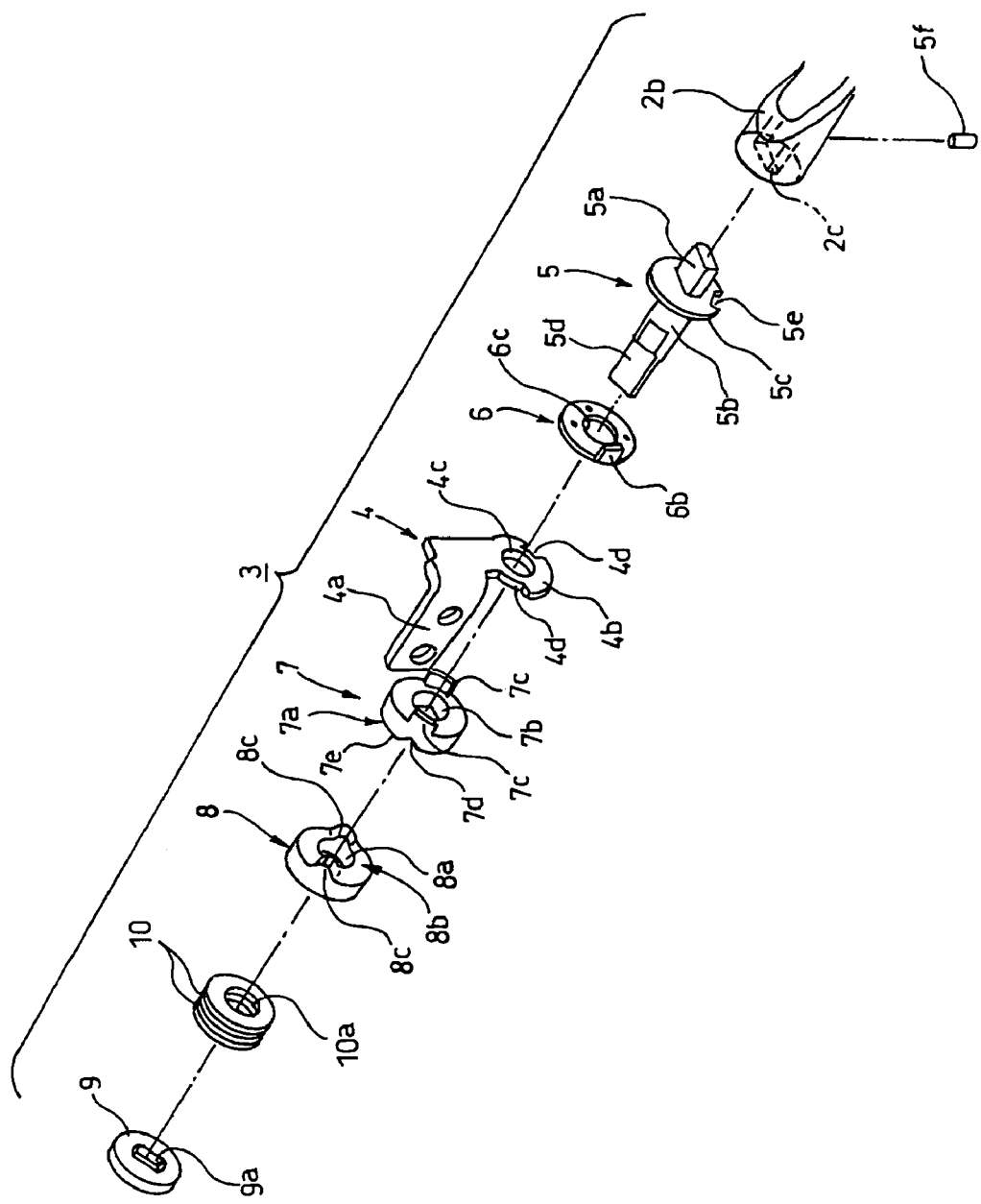
FIG. 6 is an enlarged exploded perspective view of either one of vertical direction rotation controlling means of a biaxial hinge device according to the present invention.
Figure 7:
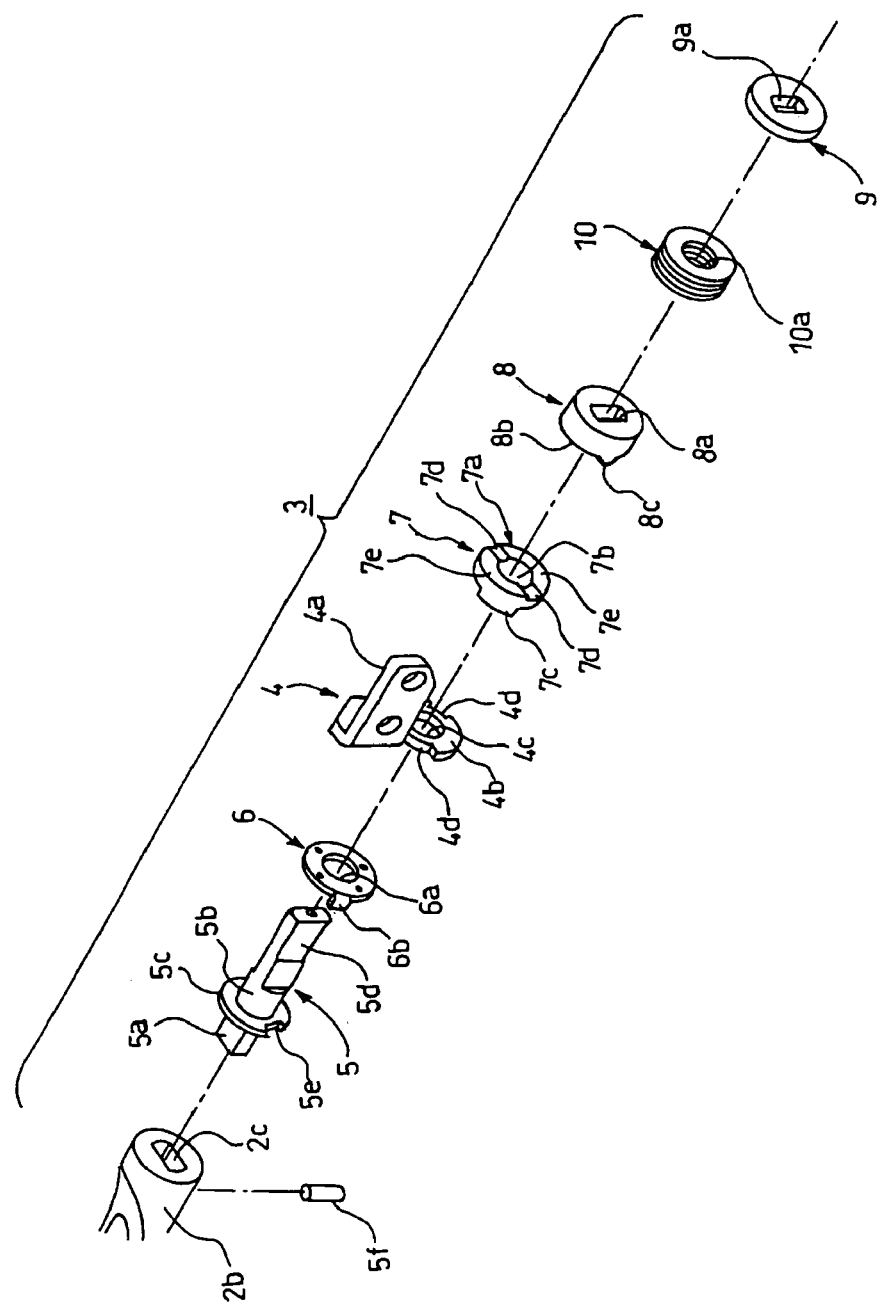
FIG. 7 is an enlarged exploded perspective view of either other one of vertical direction rotation controlling means of a biaxial hinge device according to the present invention.
Figure 8:
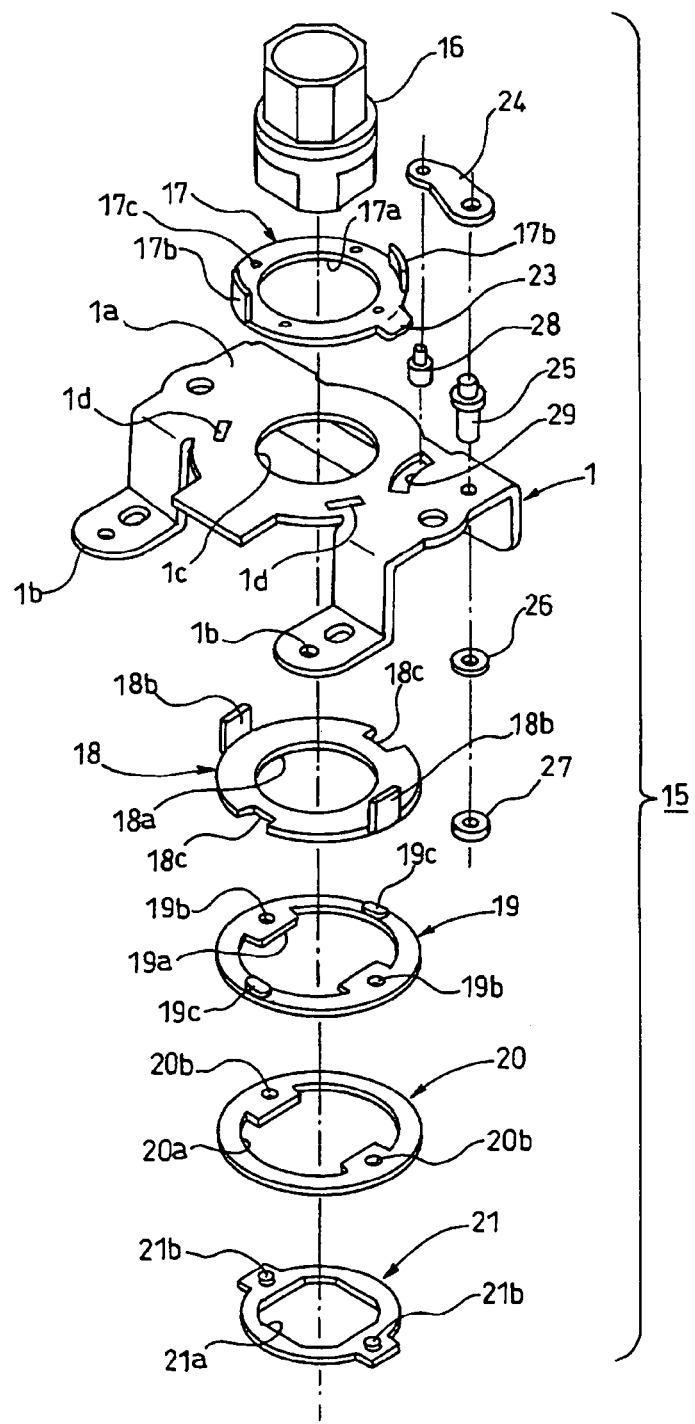
FIG. 8 is an enlarged exploded perspective view of a horizontal direction controlling means of a biaxial hinge device according to the present invention.

A reference numeral 2 indicates a supporting member. The supporting member 2 supports a second member B which is shown in FIGS. 1 and 3 with an imaginary line; the second member B is an LCD display portion of a laptop personal computer. The supporting member 2 has a shape substantially of a letter T in front view, provided with a main body cylinder portion 2a and supporting arm portions 2b, 2b which stretch on the right and left in a horizontal direction of a main body cylinder portion 2a. Brackets 4, 4 are each attached through a pair of vertical direction rotation controlling means 3, 3 to each free end of each of the supporting arm portions 2b, 2b; attaching pieces 4a, 4a of the brackets 4, 4 are attached to a rear end portion of the second member B.

As per a pair of vertical direction rotation controlling means 3, 3, since both are the same in structure, a description herein is made for either one, and a description is omitted for the other one. An attaching non-circular hole 2c is cut through the free end of a supporting arm portion 2b, and in a coaxial direction therewith; a small diameter non-circular attaching portion 5a is inserted into a attaching non-circular hole 2c and engaged therewith, and fixed to the supporting arm portion 2b via an attaching screw 5f.

A bracket 4 as described above has a plane portion 4b, which is formed of a portion of an attaching portion 4a folded vertically; an insertion hole 4c is cut through a plane portion 4b; a circular small diameter portion 5b, 5b of a shaft 5, 5, is inserted into the insertion hole 4c and rotatably attached. The shaft 5 has, other than the circular small diameter portion 5b, a large diameter portion 5c and a non-circular small diameter portion 5d; a friction washer 6 is attached between a larger diameter portion 5c and a plane portion 4b, insertion holes 6a are each cut through a friction washer 6, a circular small diameter portion 5b of the shafts 5 is inserted through the insertion hole 6a, and therefore the friction washer 6 is attached to the shaft 5. An engagement piece 6b is formed of a portion folded on edge portions, and the engagement piece 6b is engaged with an arresting groove 5e which is mounted on an edge portion of a small diameter portion 5c, thus a rotation of the friction washer 6 is restricted by the shaft 5.

A rotation cam 7 is attached to a shaft 5 protruding from the side on which a plane portion 4b of bracket 4 is not contacted with a friction washer 6, by an insertion of a circular small diameter portion 5b of the shaft 5 into an insertion hole 7b mounted on a central portion of the rotation cam 7 in an axial direction; a pair of arresting projections 7c, 7c are projected on edge portions of the rotation cam 7 on the side on which the rotation cam 7 is contacted with the plane portion 4b of the bracket 4; a rotation of the rotation cam 7 is restricted by the bracket 4, by a structure in which the arresting projections 7c, 7c are each engaged with each of the arresting grooves 4d, 4d cut through edge portion of the plane portion 4b of the bracket 4.

A reference numeral 8 indicates a fixing cam. The fixing cam 8 is equipped with an insertion hole 8a, which has a shape so as to allow for an engagement thereof with a non-circular small diameter portion 5d. The non-circular small diameter portion 5d is inserted through the insertion hole 8a of the fixing cam 8 and engaged therewith so as to be attached to the fixing cam 8 without rotation.

A reference numeral 9 indicates pressure washer which is relatively thick. The pressure washer 9 is equipped with an insertion hole 9a, which has a shape so as to allow for an engagement thereof with a non-circular small diameter portion 5d of a shaft 5. The pressure washer 9 is thus inserted through and engaged with a non-circular small diameter portion 5d of the shaft 5.

A reference numeral 10 indicates resilient means. The resilient means 10 is composed of a plurality of plate springs and an insertion hole 10a cut through each of central portions of the plate springs. The plate springs are attached between a pressure washer 9 and a fixing cam 8.

Furthermore, a non-circular small diameter portion 5d of a shaft 5 is caulked on an end surface thereof, by which a rotation cam 7 and a fixing cam 8 is pressingly contacted with each other on cam portions of both, i.e. a cam portion 7a and a cam portion 8b; thus a pressing contact force is generated in the above-described pressing contact condition, and another between a friction washer 6 and a large diameter portion 5c of the shaft 5, these pressing contact forces further allow a friction torque to be generated.

A cam portion 8b has convex portions 8c, 8c which are set at an interval of 180°. The convex portions 8c, 8c protrude in a shape substantially of a triangle, each with a round fore end portion. A cam portion 7a has concave portions 7d, 7d set at an interval of 180°, and a plane portion 7e other than the concave portions 7d. The concave portions 7d, 7d have a shape which allows the convex portions 8c, 8c to be fitted therein.

With regard to vertical direction rotation controlling means 3 as above described, a structure using friction washers or spring washers other than the above, or otherwise the one using resilient means or known friction mechanisms with compression springs is acceptable; the structure has no limitations, and various known structures are available.

Moreover, a supporting member 2 is rotatably attached through a horizontal direction rotation controlling means 15 in a horizontal direction to an attaching member 1. The horizontal direction rotation controlling means 15 is composed of: a rotation cylinder portion 16 which is, by caulking a non-circular attaching portion 16a inserted through and engaged with a non-circular attaching hole 2d of a main body cylinder portion 2a, fixed to a main body cylinder portion 2a and attached to an attaching hole 1c which, cut through an attaching base portion 1a of an attaching portion 1, allows the non-circular attaching portion 16a to be rotated; A friction washer 17 which has an insertion hole 17a cut through a central portion thereof and a pair of arresting pieces 17b, 17b set on edge portion of the friction washer 17, and accommodates a rotation cylinder portion 16 to be rotatably inserted through an insertion hole 17a, with a rotation thereof restricted with regard to the rotation cylinder portion 16, due to an engagement of a pair of arresting pieces 17b, 17b with arresting grooves 2e, 2e (only partially indicated) cut through the main body cylinder portion 16; a first click washer 18 which has a circular insertion hole 18a cut through a central portion thereof and arresting pieces 18b, 18b formed from portions folded on the corner of the first click washer 18 and accommodates a rotation cylinder portion 16 to abut on attaching base portions 1b from below and to be rotatably inserted through a circular insertion hole 18a, with a rotation restricted by a main body cylinder portion 2a, due to an insertion of arresting pieces 18b, 18b through arresting holes 1d, 1d cut through the attaching base portion 1a and an engagement therewith; a second click washer 19 which accommodates, having a contact with the first click washer 18, a non-circular portion 16c of the rotation cylinder portion 16 to be inserted through a non-circular insertion hole 19a on a central portion thereof, engaged therewith and attached thereto; a third click washer 20 which accommodates, having a contact with the second click washer 19, a non-circular portion 16c of the rotation cylinder portion 16 to be inserted through a non-circular insertion hole 21a on a central portion thereof, engaged therewith and attached thereto; and a forth click washer 21 which accommodates, having a contact with the third click washer 20, a non-circular portion 16c of rotation cylinder portion 16 to be inserted through a non-circular insertion hole 21a on a central portion thereof, engaged therewith and attached thereto.

Then, a friction washer 17 and a first click washer 18 are press-contacted with both sides of an attaching base portion 1a by caulking a side of a rotation cylinder portion 16 with a forth click washer 21, and further the first click washer 18 to the forth click washer 21 are press-contacted with each other and toward the first click washer 18, having a press contact with each other.

Small holes 17c for collecting lubricant are cut through a surface of a friction washer 17; other small holes 19b and 20b, again for collection of lubricant, are cut through surfaces of a second click washer 19 and third click washer 20. A pair of notch portions 18c are cut through edge portion of a first click washer 18. Further a pair of convex portions 19c, 19c, on the sides opposed to each other are formed on a surface of the first click washer 18, and a pair of concave portions 21b, 21b on the sides opposed to each other on a surface of a forth click washer 21.

Moreover, a fixing stopper 23 is formed on an edge portion of friction washer 17, a movable stopper 24 swingably mounted to an attaching base portion 1a of an attaching member 1. The fixing stopper 23 and the movable stopper 24 constitute movable stopper means 22. The movable stopper 24 is mounted on an attaching base portion 1a via an attaching pin 25 caulked and thus fixed to the attaching base portion 1a. The movable stopper 24 is structured so as to generate a friction torque thereon, via a friction washer 26 and a pressure washer 27 working on the attaching pin 25, namely a portion of the attaching pin 25 protruding from the pressure washer 27 is caulked. A stopper pin 28 is attached on a free end side of a movable stopper 24, and it is fitted into a guide hole 29 cut through a fan-like form on the attaching base portion 1a. Due to this structure, the movable stopper 24 is rotatable only when it is pressed with a predetermined pressing force working at a defined rotation angle.

Hereinafter, a function is described. First, as per the function of the vertical direction rotation controlling means 3, the second member B is attached to the attaching pieces 4a, 4a of the brackets 4 of the vertical direction rotation controlling means 3, 3, and normally closed and superimposed on the first member A. As shown in FIG. 1, the second member B is rotatable with regard to the first member A in a vertical direction, since brackets 4 are each rotated around an axis of the shafts 5, 5 as first axis. However, when the first member A and the second member B are each closed, the second member B is locked with regard to the first member A, since the convex portion 8c, 8c of the cam portion 8b on each of the fixing cams 8, 8 fall to the concave portions 7d, 7d cut through the cam portion 7a of either one of the rotation cams 7.

When the second member B is pressed in a direction perpendicular to the first member A, with a operator's hand on a front side (on his side), the second member B is opened with regard to the first member A, since the convex portions 8c, 8c of each of the cam portions 8b, 8b each get out of the concave portions 7d, 7d of each of the cam portions 7, 7, against a resilient force of the resilient means 10. Thereafter the convex portions 7e, 7e of each of the cam portions 7a, 7a are press-contacted, due to a resilient force of a resilient means 10, with the convex portions 8c, 8c of each of the cam portions 8b, 8b, allowing the first member A and the second member B to be freely halted and thus opened and closed.

When a second member B is opened with regard to a first member A to reach to degrees slightly less than 180°, convex portions 8c, 8c of each of the cam portions 8,8, begin to intrude from the convex portions 7e, 7e into concave portions 7d, 7d of each of the cam portions 7, 7, and therefore the second member B is automatically opened up to 180°. This movement is called inlet movement, or swivel movement. At 180°, the second member B is locked at the condition since the convex portions 8c, 8c of each of the cam portions 8, 8, have fallen into the concave portions 7d, 7d of each of the cam portions 7, 7. Further at 180°, a stopper which is not shown in Figs. prevents the second member B from further opening with regard to the first member A.

When the second member B once opened with regard to the first member A is to be closed, by means of an operation contrary to that described above, a second member B is closed, allowing it to be freely halted; the second member B is automatically closed due to an inlet movement as above described and locked in a closed condition, since just before a complete closing, the convex portions 8c, 8c of each of the cam portions 8, 8 each intrude from the convex portions 7e, 7e into the concave portions 7d, 7d of each of the cam portions 7, 7.

In the meantime, a half opened angle at which the second member B is halted is changed at discretion via changes in positions of the convex portions and the concave portions of each of the cam portions 7a, 7a and 8b, 8b. Further a fully opened angle is also selected at discretion.

In the following a description is made as per a function of the horizontal direction rotation controlling means 15. In a normal condition, a rotation cylinder portion 16, attached to the main body cylinder portion 2a of the supporting member 2, is locked: the convex portions 19c, 19c, formed on a top surface of the second click washer 19 attached to the rotation cylinder portion 16 with a rotation restricted, are inserted into and engaged with the notch portions 18c, 18c of the first click washer 18, which are arrested by the attaching base portion 1a of the attaching member 1, fixed thereto and locked at that position. This condition is retained, unless a rotation pressing force is brought on the rotation cylinder portion 16 around the axis thereof. This condition is defined as 0° for illustrative purposes.

In case that an operator needs, after the second member B is opened in a direction perpendicular to a first member A as described above, to rotate the second member B in a horizontal direction to right and left in order to show on-screen display on the second member B to the people right and left on his opposite side, he can show the display by rotating the second member B either to the right or to the left with regard to the first member A, since the convex portions 19c, 19c get out of the notch portions 18c, 18c. Then when opened up to 180°, the second member B stops at the position since a fixing stopper 23 is contacted with a movable stopper 24 and the convex portions 19c, 19c each fall again into the notch portions 18c, 18c.

At the point conventionally, since a fixing stopper means is located at 180° to prevent the second member B once set at 180° from further rotation, the second member B can not rotate in a direction different from the one described above, if not reversed to the original position at 0°. However, according to the present invention, the second member B, once set at 180°, can be additionally rotated using the movable stopper means 22 in the same direction, by pressing it beyond 180° in a direction in which it is rotated.

In other words, when the second member B is rotated from 0° to 180° in one direction with regard to the first member A, it is halted due to a contact of the fixing stopper 23 with the stopper pin 28, and the second member B once halted is pressed further in the same direction; at that time a rotation of the second member B beyond 180° is available, since the stopper pin 28 of the movable stopper 24 is pressed by the fixing stopper 23 on the friction washer 17 to be rotated together with the main body cylinder portion 2a, allowing the stopper pin 28 to be rotated with a supporting point on the attaching pin 25. Therefore, this movement allows the second member B to be rotated additionally beyond 180°, even after the second member B opened up to 180°, by pressing the second member B once halted in the same direction.

Accordingly, the second member B does not need to be first set back at 0° and then rotated in an opposite direction as in the prior art, thus cutting steps to be taken for such a rotation and improving operability. Indeed in case that a meeting or a business negotiation is held around the second member B as an LCD display portion, needs as described above may often arise, therefore it is convenient and useful to allow for a rotation of 360°, by pressing the second member in the same direction.

Furthermore, at 0° and 180° as above described, the convex portions 19c, 19c on the second click washer 19 intrude into the notch portions 18c, 18c on a first click washer 18, which results in an inlet movement. To this end, a slight declination is preferably formed on the right and left in a rotation direction of the convex portions 19c, 19c.

Additionally a structure of the horizontal direction rotation controlling means 15 is not limited to the above embodiment, but can be replaced with other known structure.

In addition as per structure of the movable stopper means 22, except the above embodiment, a movable stopper can be formed using a resilient means like a plate spring, can be so structured that by an effect of a coil spring on the movable stopper it is automatically reversed to an original position. Or otherwise, it can have a structure in which a movable stopper or a ball is biased by an effect of the resilient means in an axial direction toward the side with a fixing stopper (toward the supporting member), and in which concave portions are formed on the side with the fixing stopper for receiving the movable stopper. Moreover, a movable stopper can be attached to the side with an attaching base, and concave portions can be formed on the side with the fixing stopper (toward the supporting member).

The present invention has a structure as above described, and therefore is suitable for use in a biaxial hinge device of electrical equipment as a laptop personal computer and a notebook personal computer, which has a first member as a main body portion with keyboards and a second member as a display portion.

What is claimed is:

1. A biaxial hinge device of an electrical equipment which, with a use of a first axis and a second axis, rotates a second member of said electrical equipment with regard to a first member around said first axis for a vertical opening and closing, and which rotates said second member in a horizontal direction, said biaxial hinge device comprising:
   a pair of vertical direction rotation controlling means of said second member having said first axis;
   a horizontal direction rotation controlling means of said second member having said second axis;
   a movable stopper means provided between a supporting member of said vertical direction rotation controlling means and an attaching member of said horizontal direction rotation controlling means;
   wherein said movable stopper means comprises:
   a fixed stopper provided on an outer circumference of a friction washer which rotates together with a main body cylinder portion;
   a movable stopper attached via an attaching pin to an attaching base portion of an attaching member so as to generate a friction torque;
   a stopper pin attached to the attaching pin and fitted into a guide hole cut through said attaching base portion so as to be rotatable exclusively within a predetermined range;
   thus in rotating said second member further with respect to said first member, said stopper pin is pressed by said fixed stopper for a further rotation of said movable stopper, thereby enabling said supporting member to further rotate in the same direction against a control of said stopper pin over a rotation of said fixed stopper, so that said second member can rotate between the range of 180° to 360° in the same direction.

2. A biaxial hinge device of an electrical equipment according to the claim 1:
   wherein a movable stopper is attached to said attaching base portion of said attaching member via said attaching pin, and is adjusted so as to realize a friction rotation via a friction washer, a pressure washer, and a caulked portion of said attaching pin which protrudes from said pressure washer.

3. A biaxial hinge device of an electrical equipment according to claim 1:
   wherein said vertical direction rotation controlling means are each equipped with a rotation cam, a fixing cam, and a resilient means.

4. A biaxial hinge device of an electrical equipment according to claim 1:
   wherein said horizontal direction rotation controlling means is equipped with a click means for stably halting said second member at a predetermined rotation angle in a horizontal direction with regard to said first member.

5. A biaxial hinge device of an electrical equipment according to claim 2:

wherein said vertical direction rotation controlling means are each equipped with a rotation cam, a fixing cam, and a resilient means.

6. A biaxial hinge device of an electrical equipment according to claim 2:

wherein said horizontal direction rotation controlling means is equipped with a click means for stably halting said second member at a predetermined rotation angle in a horizontal direction with regard to said first member.

7. A biaxial hinge device of an electrical equipment according to claim 3:

wherein said horizontal direction rotation controlling means is equipped with a click means for stably halting said second member at a predetermined rotation angle in a horizontal direction with regard to said first member.

* * * * *